Feb. 11, 1958  B. G. HORSTMANN ET AL  2,822,836
WORK TABLES FOR WOODWORKING AND LIKE MACHINES
Filed July 23, 1956  2 Sheets-Sheet 1

INVENTORS
B. G. HORSTMANN
T. SHERWEN
By

Feb. 11, 1958   B. G. HORSTMANN ET AL   2,822,836
WORK TABLES FOR WOODWORKING AND LIKE MACHINES
Filed July 23, 1956   2 Sheets-Sheet 2
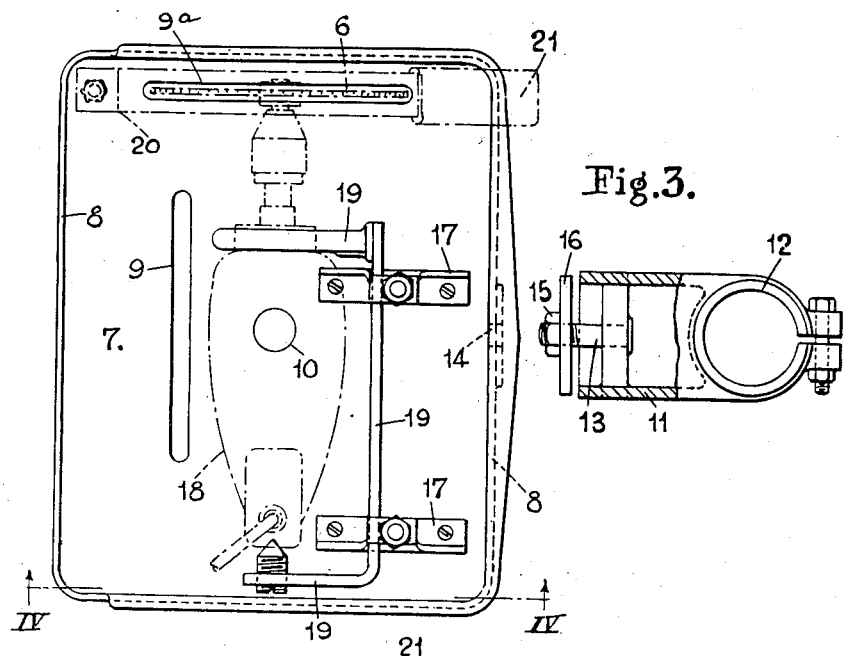
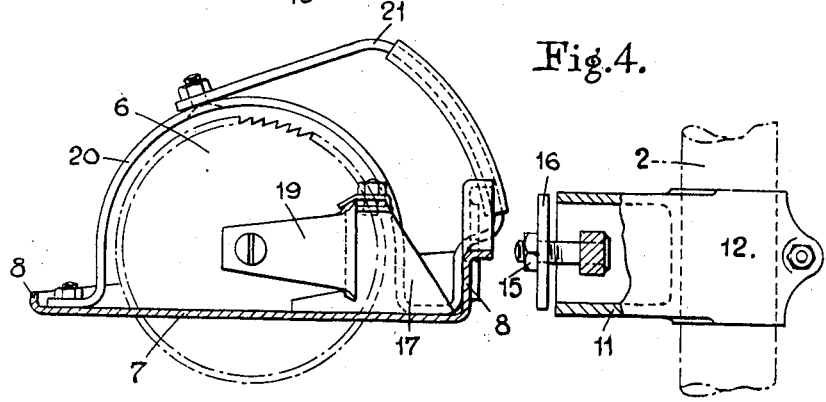
INVENTORS
B.G. HORSTMANN
T. SHERWEN.
By
Atty.

United States Patent Office 2,822,836
Patented Feb. 11, 1958

2,822,836

WORK TABLES FOR WOODWORKING AND LIKE MACHINES

Bevan Graham Horstmann, Bath, and Theo Sherwen, Nailsworth, England

Application July 23, 1956, Serial No. 599,625

Claims priority, application Great Britain September 15, 1955

2 Claims. (Cl. 143—132)

This invention relates to improvements in work tables for comparatively small lightweight wood-working and like machines. An object of the invention is to provide a table which may be secured to such a machine of the kind employing a cantilever beam extending from a pillar secured to a workbench and carrying adjustably thereon a self-contained electric motor-driven tool, said table being capable of being positioned either over or below the beam. Examples of machines of this kind to which the present invention is applicable are described in co-pending application No. 578,264. A further object is to enable a table of this description to be readily detached from the machine and quickly adapted for use as a portable power-driven wood-working saw. The advantage of such a use will be readily appreciated when it is realised that wood-working machines of the kind described are used to a great extent in home workshops where space around the machine is limited, and the raw material has to be sawn into workable sizes remote from the machine.

According to the invention, a work table for a wood-working and like machine comprises a plate having a down-turned flange on at least one edge from which extends a securing bracket parallel to the plane of the plate and carrying a split clamping ring, said bracket being detachably secured to the flange, a pair of brackets fixed to one surface of the plate and extending in spaced relation to afford means for securing a motor-driven tool to the plate, and slots in the plate to accommodate a circular saw located either separately from the plate on a structure on which the table is attached or on a portable motor held between the said brackets.

Such a table, without the tool, can be supported by the pillar of the machine by means of the clamping ring over the cantilever beam and thus over the tool carried thereby so that work-pieces laid on the table can be worked on from underneath and through slots or holes in the table. Alternatively the table may be disposed underneath the beam and its tool if the nature of the operations requires operating on the work-piece from overhead. As mentioned, the table may be removed from the pillar altogether (or simply from the bracket secured to the flange thereof) and turned upside-down so that the tool can be clamped on the under face with a circular saw fixed to its chuck to project downwards through a suitable slot, and then used as a portable saw.

In order that the said invention may be readily understood an embodiment thereof will be described by way of example with the aid of the accompanying drawings wherein:

Figure 3 is a plan view of the table (in the position occupied in Figure 2) with a motor-driven saw shown in broken lines, and with the detached bracket shown partly in section; and, Figure 4 represents a section on the line IV—IV of Figure 3, but with the saw guard and handle shown in full lines.

Like numerals of reference indicate corresponding parts in the several views.

Figure 1:
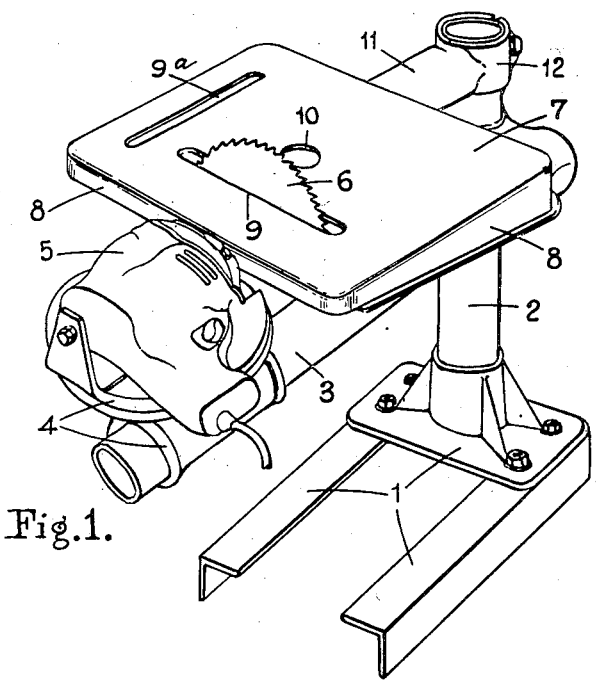
Figure 1 is a perspective view of a wood-working machine fitted with a table according to the invention.

In Figure 1 there are shown parts of a wood-working machine comprising a base 1 supporting at one end a vertical pillar 2 to which is secured a cantilever beam 3 on which is adjustably mounted a carrier 4 for a portable electric motor 5 which actuates a circular saw 6. This construction of machine forms no part of the present invention.

Above the beam 3 there is positioned a table consisting of a plate 7 of rectangular shape with a surrounding rim composed of flanges 8 forming a tray which in its positions of use on the machine is inverted i. e. with the rim 8 downwardly extending around its edges. It has a first slot 9 and a second slot 9a, at right-angles to one another, and a central hole 10. The rim 8 at one edge is fitted with a bracket 11 extending in a plane parallel to the plate or table top 7 and terminating in a split tube 12 adapted to fit the pillar 2 of the wood-working machine and to be clamped thereon. With reference to Figures 3 and 4, this bracket 11 is secured to the flange 8 by means of a threaded stud 13 projecting therefrom and engaging a hole 14 in the flange against which it is tightened by means of a clamping nut 15 with the interposition of a suitable washer or washers 16. The table may be turned out of the horizontal plane by slacking off the nut 15 and rotating about the axis of the stud 13, re-tightening the nut when the required degree of tilt has been attained.

Underneath the table (see particularly Figures 3 and 4) in the tray-like space there are provided a number of clamping brackets 17 whereby a power-driven tool 18 may be secured on the underside of the table. For example, these brackets 17 may be in pairs between which a carrier 19 holding the tool 18 may be clamped so that the circular saw 6 operated by the tool projects through an appropriate slot in the table. Such a tool would be fixed in position when the table has been detached from the machine (as in Figure 2) for adaptation as a portable circular saw. For such a purpose the table would be turned upside down from the position normally assumed on the machine as in Figure 1. As a portable circular saw an arcuate guard 20 is secured on the table face containing the tool (see Figures 2, 3 and 4) so as to protect the used from the circular saw, and a handle 21 would be provided. This handle could advantageously consist of a bent strip secured to the guard and bent so as to be secured to the rim of the table.

Figure 2:
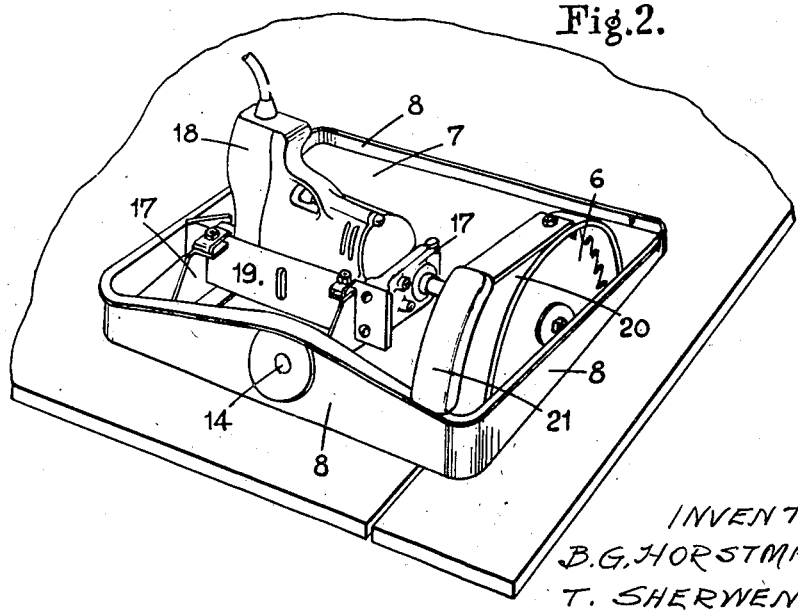
Figure 2 is a perspective view of the table detached, turned upside down, and fitted for use as a portable circular saw.

When used as part of a machine as in Figure 1, the table without the electric tool 18, tool carrier 19 and guard 20 with handle 21, is attached to the bracket 11 and clamped on the pillar 2. It is disposed with rim 8 downwards and may be either above or under the beam 3 according to the work to be done and the way the motor 5 is mounted on the beam. For use as a portable saw it is detached from the bracket 11 and the power-driven tool 18, guard 20 and other parts seen in Figure 2 are fitted in the tray of the table which is now used upside down with reference to Figure 1.

Although the table according to the invention has been described as primarily for use with a tool carrying a circular saw, it is to be understood that the slots and other openings therein or one or some of them may include a shape suitable for the passage therethrough of various other tools (e. g. disc grinders, rotary planes and so forth) for operating on the workpiece supported on the table or on or against which the table is placed.

We claim:

1. A plate for use with woodworking implements such as a motor-driven circular tool, said plate having a top and a bottom and reversible selectively for connection with a bracket on a post to support the work relative to the tool and when inverted supporting the tool relative to the work, said plate having first and second right-angularly disposed tool-receiving slots, a flange at the edge of the plate opposite said first slot, said flange having an opening to receive a stud carried by said bracket to hold the top surface of the plate uppermost, and a tool carrier on the bottom surface of the plate for clamping a motor-driven circular tool thereto with said tool disposed in said second slot when the bottom surface of the plate is uppermost.

2. A plate for use with woodworking implements according to claim 1, wherein a combined tool guard and handle is affixed to the bottom of the plate when the motor-driven circular tool is disposed in the second slot.

References Cited in the file of this patent

UNITED STATES PATENTS

| | | |
|---|---|---|
| 595,850 | Flickinger | Dec. 21, 1897 |
| 688,653 | Lambert | Dec. 10, 1901 |
| 1,801,721 | Caldwell | Apr. 21, 1931 |
| 1,960,590 | McKay | May 29, 1934 |